US009647556B2

(12) United States Patent
Li et al.

(10) Patent No.: US 9,647,556 B2
(45) Date of Patent: May 9, 2017

(54) DC TO DC CONVERTERS AND CONTROLLERS THEREOF

(71) Applicant: O2Micro, Inc., Santa Clara, CA (US)

(72) Inventors: Gang Li, Shenzhen (CN); Fengjiang Zhang, Chengdu (CN); Guoyong Guo, San Jose, CA (US)

(73) Assignee: O2Micro, Inc., Santa Clara, CA (US)

( * ) Notice: Subject to any disclaimer, the term of this patent is extended or adjusted under 35 U.S.C. 154(b) by 233 days.

(21) Appl. No.: 14/326,196

(22) Filed: Jul. 8, 2014

(65) Prior Publication Data

US 2016/0013713 A1   Jan. 14, 2016

(51) Int. Cl.
| H02M 3/156 | (2006.01) |
| H02M 3/158 | (2006.01) |
| H02M 1/36 | (2007.01) |
| H02M 1/00 | (2006.01) |

(52) U.S. Cl.
CPC ............ *H02M 3/1584* (2013.01); *H02M 1/36* (2013.01); *H02M 3/156* (2013.01); *H02M 2001/0003* (2013.01); *H02M 2003/1566* (2013.01); *H02M 2003/1586* (2013.01)

(58) Field of Classification Search
CPC ... G05F 1/56; G05F 1/577; G05F 1/59; G05F 3/24; G05F 3/242; G05F 3/247; G05F 3/262; G05F 3/265; G05F 3/30; H02M 3/155; H02M 3/156; H02M 3/158; H02M 3/1582; H02M 3/1584; H02M 2003/1586
USPC .......................... 323/304, 311, 312, 315, 317
See application file for complete search history.

(56) References Cited

U.S. PATENT DOCUMENTS

| 6,285,571 B1 * | 9/2001 | Brooks ............... H02M 3/1584 323/272 |
| 6,495,995 B2 * | 12/2002 | Groom ............... H02M 3/1584 323/283 |
| 6,683,441 B2 * | 1/2004 | Schiff ................. H02M 3/1584 323/222 |
| 7,759,919 B2 * | 7/2010 | Bernacchia ......... H02M 3/1584 323/272 |
| 7,911,194 B2 * | 3/2011 | Cheung ............... H02M 3/1584 323/282 |
| 8,063,619 B2 * | 11/2011 | Zhu .......................... H02J 7/32 323/266 |
| 8,188,721 B2 * | 5/2012 | Isham ................... H02M 3/156 323/282 |

(Continued)

*Primary Examiner* — Jessica Han
*Assistant Examiner* — David A. Singh

(57) ABSTRACT

In a controller for a DC to DC converter, PWM signal generating circuitry generates a set of PWM signals phase-shifted relative to one another, and controls states of the PWM signals according to a set of control signals. Each PWM signal of the PWM signals has an on-time state and an off-time state. Ramp signal generating circuitry, coupled to the PWM signal generating circuitry, generates a set of ramp signals having substantially the same ramp slope. Each ramp signal of the ramp signals is generated in response to detecting an on-time state of a corresponding PWM signal of the PWM signals. Additionally, a comparing circuit, coupled to the PWM and ramp signal generating circuitry, alternately compares the ramp signals with a preset reference to generate the control signals. A corresponding control signal of the control signals changes the corresponding PWM signal from the on-time state to an off-time state.

21 Claims, 8 Drawing Sheets

(56) References Cited

U.S. PATENT DOCUMENTS

| | | | | |
|---|---|---|---|---|
| 8,704,500 B2* | 4/2014 | Xiao | .................. | H02M 3/1584 |
| | | | | 323/272 |
| 9,106,201 B1* | 8/2015 | Chakraborty | | |
| 2004/0036452 A1* | 2/2004 | Brooks | ............... | H02M 3/1584 |
| | | | | 323/237 |
| 2005/0010825 A1* | 1/2005 | Pullen | ................ | H02M 3/1584 |
| | | | | 713/300 |
| 2006/0028188 A1* | 2/2006 | Hartular | ............... | H02M 3/156 |
| | | | | 323/273 |
| 2011/0280353 A1* | 11/2011 | Chen | ......................... | G06F 1/04 |
| | | | | 375/354 |
| 2013/0038312 A1* | 2/2013 | Wang | .................. | H02M 3/1584 |
| | | | | 323/288 |
| 2013/0200864 A1* | 8/2013 | Huang | .................. | H02M 3/156 |
| | | | | 323/271 |
| 2014/0049240 A1* | 2/2014 | Chen | ......................... | G05F 1/10 |
| | | | | 323/282 |
| 2014/0217999 A1* | 8/2014 | Wibben | .................. | H02M 1/36 |
| | | | | 323/282 |
| 2015/0381041 A1* | 12/2015 | Chang | .................. | H02M 3/156 |
| | | | | 323/271 |

\* cited by examiner

DC TO DC CONVERTERS AND CONTROLLERS THEREOF

BACKGROUND

FIG. 1 illustrates a block diagram of a conventional multi-phase DC to DC (direct-current to direct-current) converter such as a two-phase DC to DC converter 100. The DC to DC converter 100 includes two controllers 102, two switching circuits 104, two inductors 108, and an output capacitor 110. Each switching circuit 104 includes a high-side switch Q1 and a low-side switch Q2. In operation, each controller 102 generates a pulse width modulated (PWM) signal to turn on corresponding switches Q1 and Q2 alternately, to cause a ripple inductor current $I_L$ through a corresponding inductor 108. Inductor currents $I_L$ through the inductors 108 are superimposed to charge the output capacitor 110, to produce an output voltage $V_{OUT}$ at the output capacitor 110. The controllers 102 can control duty cycles of their corresponding PWM signals to regulate the output voltage $V_{OUT}$.

However, since the DC to DC converter 100 utilizes independent controllers 102 to control duty cycles of the PWM signals, the PWM signals may have different pulse widths caused by differences between the controllers 102. Consequently, the inductor currents $I_L$ through the inductors 108 may be unbalanced from each other, which causes error in the output voltage $V_{OUT}$ and reduces performance of the DC to DC converter 100.

SUMMARY

Thus, there is a need for a controller that balances inductor currents in a multi-phase DC to DC converter. Embodiments according to the present invention provide such a controller.

In one embodiment, in a controller for a DC to DC converter, PWM signal generating circuitry generates a set of PWM signals phase-shifted relative to one another, and controls states of the PWM signals according to a set of control signals. Each PWM signal of the PWM signals has an on-time state and an off-time state. In the controller, ramp signal generating circuitry is coupled to the PWM signal generating circuitry and generates a set of ramp signals having substantially the same ramp slope. Each ramp signal of the ramp signals is generated in response to detecting an on-time state of a corresponding PWM signal of the PWM signals. Additionally, a comparing circuit is coupled to the PWM signal generating circuitry and the ramp signal generating circuitry, and alternately compares the ramp signals with a preset reference to generate the control signals. A corresponding control signal of the control signals changes the corresponding PWM signal from the on-time state to an off-time state.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

An embodiment according to the present invention provides a multi-phase DC to DC converter. The DC to DC converter includes multiple inductive components, and can generate a set of PWM signals to control currents through the inductive components and thereby controlling output power of the DC to DC converter. The DC to DC converter can control states of the PWM signals such that the currents through the inductive components are balanced with one another. Advantageously, compared with a conventional multi-phase DC to DC converter, the DC to DC converter in an embodiment according to the present invention can have an output voltage with less error and with enhanced performance.

Figure 1:
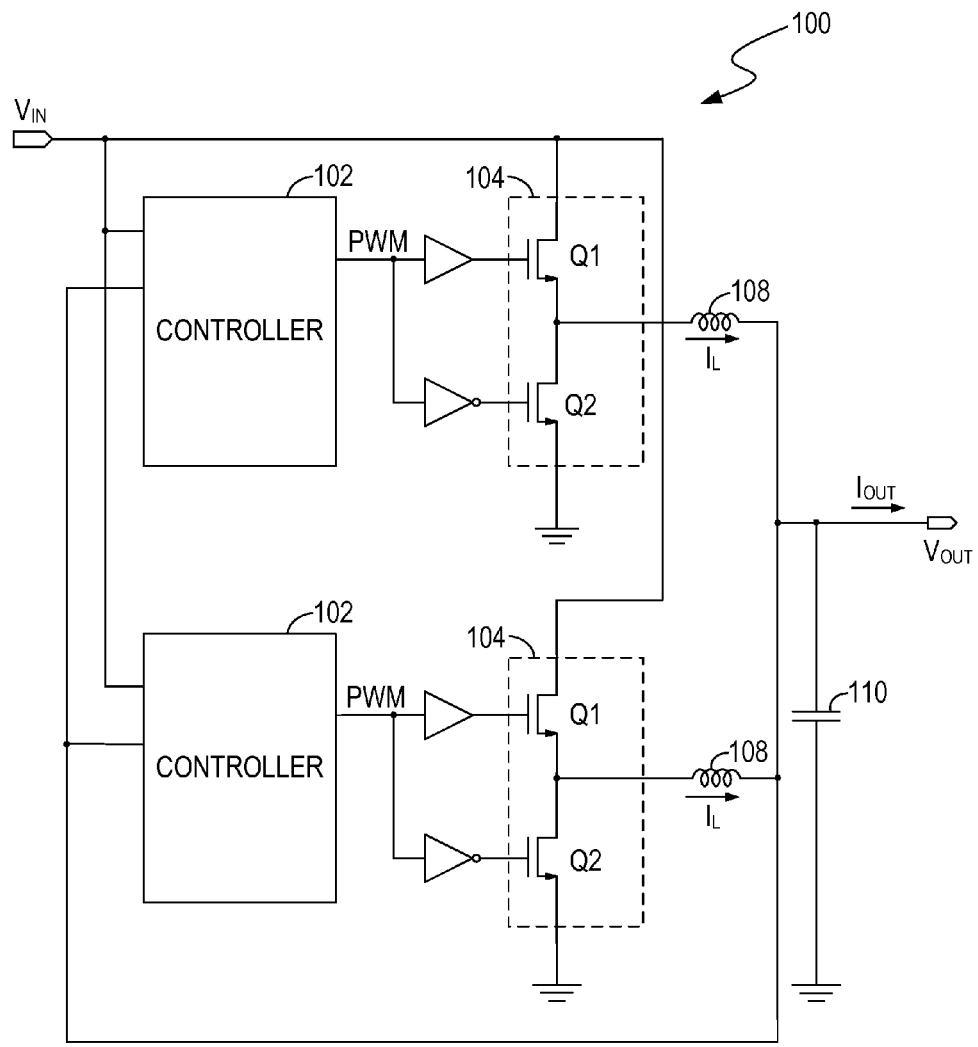
FIG. 1 illustrates a block diagram of a conventional DC to DC converter.
Figure 2:
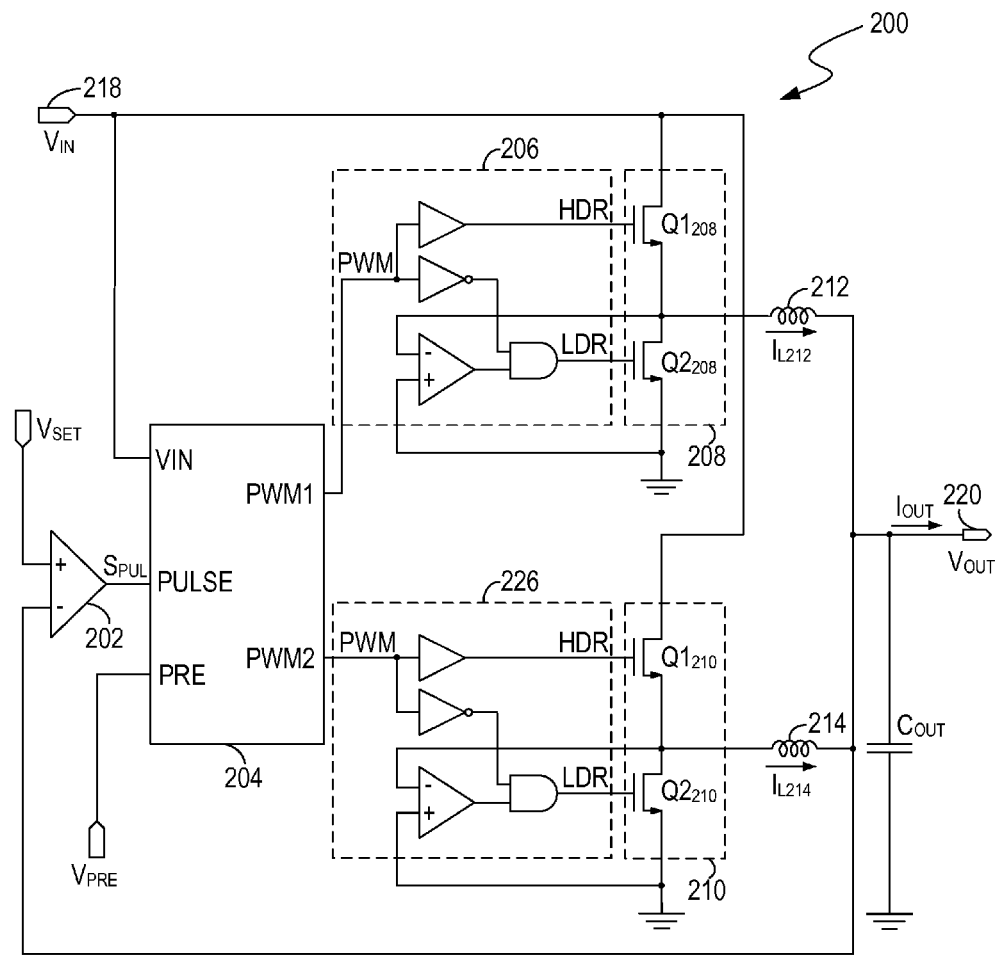
FIG. 2 illustrates a block diagram of an example of a DC to DC converter, in an embodiment according to the present invention.

FIG. 2 illustrates a block diagram of an example of a multi-phase DC to DC converter 200, in an embodiment according to the present invention. In the example of FIG. 2, the DC to DC converter 200 is a buck converter that converts an input voltage $V_{IN}$ at a high-side terminal 218 to an output voltage $V_{OUT}$ at a low-side terminal 220, and the output voltage is less than the input voltage. However, the invention is not so limited. In another embodiment, the DC to DC converter 200 is a boost converter that converts an input voltage at the low-side terminal 220 to an output voltage at the high-side terminal 218, and the output voltage is greater than the input voltage. In yet another embodiment, the DC to DC converter 200 is a buck-boost converter. As shown in FIG. 2, the DC to DC converter 200 includes a comparator 202, a controller 204, driver circuits 206 and 226, switching circuits 208 and 210, inductors 212 and 214, and an output capacitor $C_{OUT}$. The switching circuit 208 includes a high-side switch $Q1_{208}$ and a low-side switch $Q2_{208}$. The switching circuit 210 includes a high-side switch $Q1_{210}$ and a low-side switch $Q2_{210}$.

In one embodiment, the controller 204 has a power supply input terminal (labeled "VIN") to receive the input voltage $V_{IN}$, an input terminal (labeled "PULSE") to receive a comparison signal $S_{PUL}$ from the comparator 202, and an input terminal (labeled "PRE") to receive a preset reference $V_{PRE}$. The controller 204 also has an output terminal (labeled "PWM1") to provide a first PWM signal (hereinafter, signal PWM1) and an output terminal (labeled "PWM2") to provide a second PWM signal (hereinafter, signal PWM2). The comparator 202 can compare the output voltage $V_{OUT}$ with a reference voltage $V_{SET}$ to generate the comparison signal $S_{PUL}$.

As shown in FIG. 2, each switching circuit 208 or 214 is coupled to a corresponding inductor 212 or 214, and can be used to allow a current to flow through the inductor. By way of example, when the high-side switch $Q1_{208}$ is on and the low-side switch $Q2_{208}$ is off, the inductor 212 receives power from the high-side terminal 218 to increase an inductor current $I_{L212}$ through the inductor 212. When the high-side switch $Q1_{208}$ is off and the low-side switch $Q2_{208}$ is on, the inductor 212 discharges power to a load (not shown) coupled to the low-side terminal 220 to decrease the inductor current $I_{L212}$. Thus, by turning the switches $Q1_{208}$ and $Q2_{208}$ on and off alternately (when one switch is off, the other is on, and vice versa), a ripple inductor current $I_{L212}$ is generated to flow through the inductor 212. Similarly, by turning the switches $Q1_{210}$ and $Q2_{210}$ on and off alternately, a ripple inductor current $I_{L214}$ is generated to flow through the inductor 214. The ripple inductor currents $I_{L212}$ and $I_{L214}$ are superimposed to charge the output capacitor $C_{OUT}$, so as to provide the output voltage $V_{OUT}$ at the low-side terminal 220. In one embodiment, the signal PWM1 is generated to turn the switches $Q1_{208}$ and $Q2_{208}$ on and off alternately, and the signal PWM2 is generated to turn switches $Q1_{210}$ and $Q2_{210}$ on and off alternately.

In one embodiment, the controller 204 receives a comparison signal $S_{PUL}$ from the comparator 202, and alternately generates signal pulses PWM1 and PWM2 according to the comparison signal $S_{PUL}$ such that the output voltage $V_{OUT}$ is adjusted to the reference voltage $V_{SET}$. More specifically, in one embodiment, the output voltage $V_{OUT}$ is a ripple voltage that alternately increases and decreases across the reference voltage $V_{SET}$. Hence, the comparator 202 can output a comparison signal $S_{PUL}$ having multiple signal pulses. In the example of FIG. 2, each pulse of the comparison signal $S_{PUL}$ indicates a situation in which the output voltage $V_{OUT}$ is less than the reference voltage $V_{SET}$. When the controller 204 detects a first pulse of the comparison signal $S_{PUL}$, the controller 204 can generate a signal pulse at its output terminal PWM1 to control the switching circuit 208 such that a ripple of the inductor current $I_{L212}$ is generated. When the controller 204 detects a second pulse of the comparison signal $S_{PUL}$, the controller 204 can generate a signal pulse at its output terminal PWM2 to control the switching circuit 210 such that a ripple of the inductor current $I_{L214}$ is generated. Thus, when the output voltage $V_{OUT}$ is less than the reference voltage $V_{SET}$, ripples of the inductor currents $I_{L212}$ and $I_{L214}$ can be generated to increase the output voltage $V_{OUT}$. As a result, the output voltage $V_{OUT}$ is adjusted to the reference voltage $V_{SET}$.

Additionally, in one embodiment, the controller 204 generates a first ramp signal RP1 and a second ramp signal RP2 (not shown in FIG. 2) which have substantially the same ramp slope. The controller 204 can also control states of the signal PWM1 and PWM2 by comparing the ramp signals RP1 and RP2 with the same preset reference $V_{PRE}$. Advantageously, in one embodiment, the controller 204 can control the signals PWM1 and PWM2 to have substantially the same on-time interval according to the comparison of the ramp signals RP1 and RP2 with the preset reference $V_{PRE}$. As a result, the inductor currents $I_{L212}$ and $I_{L214}$ can have substantially the same ripple magnitude, e.g., be balanced with each other.

Figure 3:
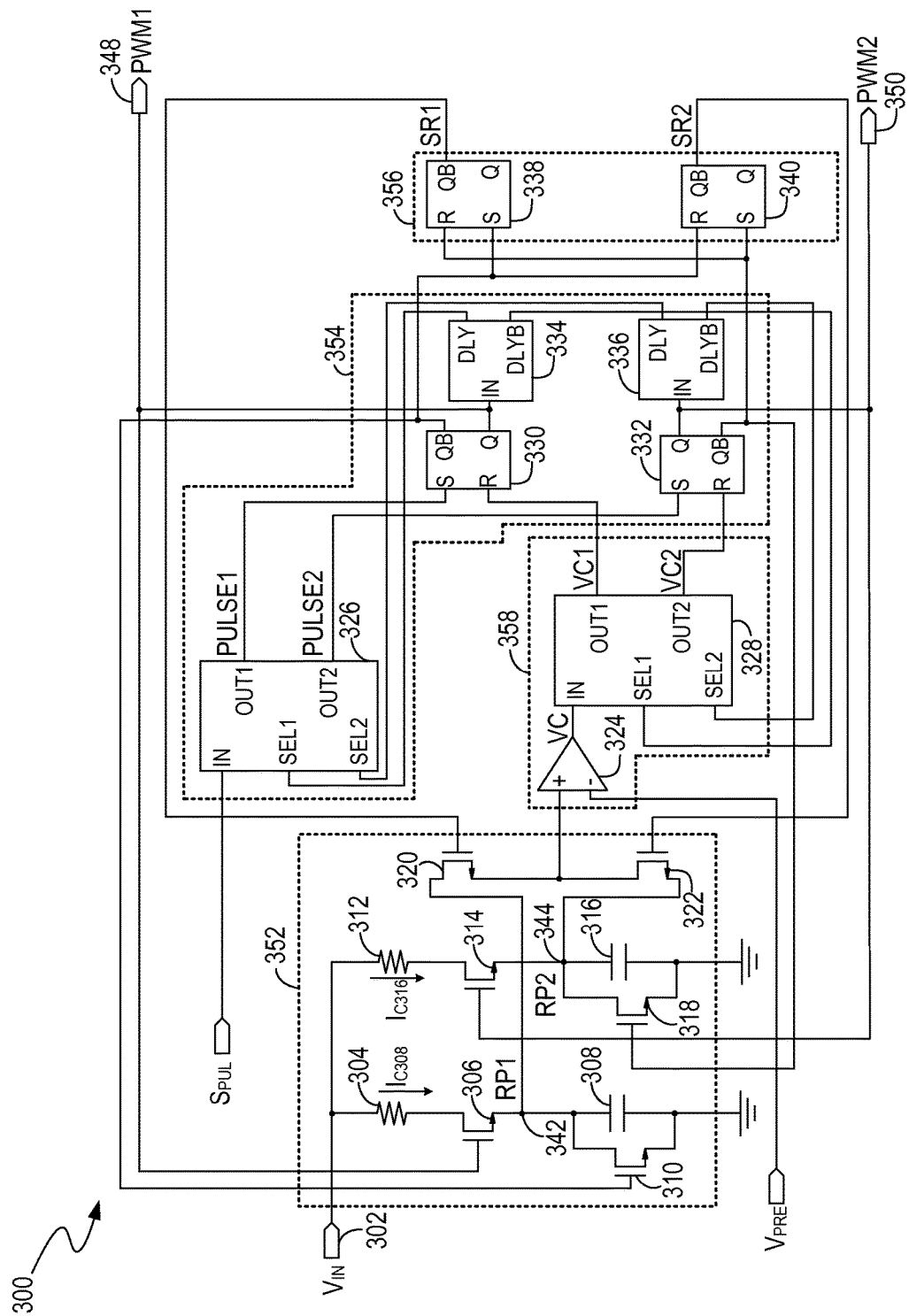
FIG. 3 illustrates a circuit diagram of an example of a controller for a DC to DC converter, in an embodiment according to the present invention.

FIG. 3 illustrates a circuit diagram of an example of a controller 300, in an embodiment according to the present invention. The controller 300 can be one embodiment of the controller 204 in FIG. 2. Elements labeled the same as in FIG. 2 have similar functions. FIG. 3 is described in combination with FIG. 2.

In one embodiment, the controller 300 includes ramp signal generating circuitry 352, a comparing circuit 358, PWM signal generating circuitry 354, and select signal generating circuitry 356. The PWM signal generating circuitry 354 (hereinafter, PWM circuitry 354) can generate a set of PWM signals, e.g., including a signal PWM1 and a signal PWM2, phase-shifted relative to one another, and control states of the PWM signals according to a set of control signals, e.g., including a first control signal VC1 and a second control signal VC2. Each PWM signal of the PWM signals has an on-time state and an off-time state. As used herein, "on-time state" means a state in which a PWM signal, e.g., PWM1 or PWM2, controls a switching circuit, e.g., 208 or 210, such that an inductor current flowing through a corresponding inductor, e.g., 212 or 214, increases. In one embodiment, a time interval during which the PWM signal is in the on-time state can be referred to as an "on-time interval" of the PWM signal. As used herein, "off-time state" means a state in which the PWM signal controls the switching circuit such that the inductor current decreases. In the examples of FIG. 2 and FIG. 3, the signal PWM1 is in an on-time state when it is at logic high, and is in an off-time state when it is at logic low; and similarly, the signal PWM2 is in an on-time state when it is at logic high, and is in an off-time state when it is at logic low.

The ramp signal generating circuitry 352 (hereinafter, ramp circuitry 352) can generate a set of ramp signals, e.g., including a first ramp signal RP1 and a second ramp signal RP2, having substantially the same ramp slope. Each ramp signal of the ramp signals is generated in response to an on-time state of a corresponding PWM signal of the PWM signals. By way of example, the ramp signal RP1 is generated in response to an on-time state of the signal PWM1, and the ramp signal RP2 is generated in response to an on-time state of the signal PWM2.

The comparing circuit 358 can alternately compare the ramp signals with a preset reference $V_{PRE}$ to generate the control signals, e.g., VC1 and VC2. Each control signal of the control signals changes a corresponding PWM signal of the PWM signals from an on-time state to an off-time state. By way of example, the control signal VC1 controls the signal PWM1 to be in an off-time state, and the control signal VC2 controls the signal PWM2 to be an off-time state. In one embodiment, the controller 204 can balance the above mentioned inductor currents $I_{L212}$ and $I_{L214}$ based the comparing of the ramp signals RP1 and RP2 with the preset reference $V_{PRE}$.

More specifically, in one embodiment, the PWM circuitry 354 includes a first selector 326, a set-reset (SR) latch 330, an SR latch 332, a delayer 334, and a delayer 336. The first selector 326 can receive the comparison signal $S_{PUL}$ at its input terminal (labeled "IN"), and generate pulses at its output terminals (labeled "OUT1" and "OUT2") alternately according to the comparison signal $S_{PUL}$. The pulses generated at the output terminal OUT1 of the first selector 326 can be referred to as trigger signals PULSE1, and the pulses generated at the output terminal OUT2 of the first selector 326 can be referred to as trigger signals PULSE2. The first selector 326 can also receive select signals at its select terminals (labeled "SEL1" and "SEL2") to determine which signal of the trigger signals PULSE1 and PULSE2 is generated. In other words, select signals at the select terminals SEL1 and SEL2 can determine which output terminal OUT1 or OUT2 of the first selector 326 is to be enabled. In one embodiment, the first selector 326 can enable its output terminal OUT2 on detection of a rising edge of a signal at its select terminal SEL1, and enable its output terminal OUT1 on detection of a rising edge of a signal at its select terminal SEL2. In one embodiment, in response to a first pulse of the comparison signal $S_{PUL}$, the first selector 326 outputs a trigger signal PULSE1. The SR latch 330 can set the signal PWM1 to be logic high, e.g., in an on-time state, via its non-inverting output terminal (labeled "Q") on detection of the trigger signal PULSE1 at its set terminal (labeled "5"). When the delayer 334 detects the logic-high level of the signal PWM1 at its input terminal (labeled "IN"), the delayer 334 can generate a select signal DLY, e.g., at logic high, with a predetermined delay $\Delta t_D$. The select signal DLY is sent to the select terminal SEL1 of the first selector 326 to enable the output terminal OUT2, so that the first selector 326 can generate a trigger signal PULSE2 if a second pulse, e.g., next to the first pulse, of the comparison signal $S_{PUL}$ occurs. In a similar manner, the SR latch 332 can set the signal PWM2 to be logic high, e.g., in an on-time state, on detection of a trigger signal PULSE2. When the delayer 336 detects the logic-high level of the signal PWM2, the delayer 336 can generate a select signal DLY', e.g., at logic high, with a predetermined delay $\Delta t_D$. The select signal DLY' is sent to the select terminal SEL2 of the first selector 326 to enable the output terminal OUT1, so that the first selector 326 can generate another trigger signal PULSE1 if a third pulse, e.g., next to the second pulse, of the comparison signal $S_{PUL}$ occurs. Operations of the delayers 334 and 336 will be described in combination with FIG. 5. As mentioned above, the comparison signal $S_{PUL}$ is generated according to comparison between the output voltage $V_{OUT}$ and a reference voltage $V_{SET}$. Accordingly, the PWM circuitry 354 can generate a set of trigger signals, e.g., including the PULSE1 and PULSE2, according to output power such as an output voltage $V_{OUT}$ of the DC to DC converter 200. The PWM circuitry 354 can also control the signal PWM1 or PWM2 to be in an on-time state upon detection of a corresponding trigger signal PULSE1 or PULSE2.

Additionally, in one embodiment, the PWM circuitry 354 can control the signal PWM1 or PWM2 to be in an off-time state according to a control signal, e.g., VC1 or VC2, from the comparing circuit 358. By way of example, the control signal VC1 can be a signal pulse, and the signal pulse can be sent to a reset terminal (labeled "R") of the SR latch 330. On detection of the control signal VC1, e.g., a signal pulse, the SR latch 330 resets its non-inverting output terminal Q, and therefore the signal PWM1 turns to logic low, e.g., an off-time state. Similarly, on detection of a control signal VC2, e.g., a signal pulse, the SR latch 332 resets its non-inverting output terminal Q, and therefore the signal PWM2 turns to logic low, e.g., an off-time state.

In one embodiment, the ramp circuitry 352 includes a set of capacitive components (e.g., including capacitors 308 and 316), switching circuitry (e.g., including charge switches 306 and 314 and discharge switches 310 and 318), and a set of resistive components (e.g., including resistors 304 and 312). The switching circuitry can be used to deliver a set of currents, e.g., including currents $I_{C308}$ and $I_{C316}$, to charge the capacitive components, and be used to discharge the capacitive components. Thus, ramp signals, e.g., RP1 and RP2, are generated at the capacitive components. By way of example, when the charge switch 306 is on and the discharge switch 310 is off, a current $I_{C308}$ is generated through the resistor 304 and the charge switch 306 to charge the capacitor 308, and a voltage at a terminal 342 of the capacitor 308 increases. When the charge switch 306 is off and the discharge switch 310 is on, the capacitor 308 discharges to ground through the switch discharge 310, and the voltage at the terminal 342 drops to, e.g., zero volts. Thus, the voltage at the terminal 342 of the capacitor 308 can have, e.g., a triangular shape, and can be referred to as a first ramp signal RP1. Similarly, a voltage at a terminal 344 of the capacitor 316 can have, e.g., a triangular shape, and can be referred to as a second ramp signal RP2.

In one embodiment, the ramp circuitry 352 can detect the states of the signals PWM1 and PWM2. In response to detecting an on-time state of the signal PWM1 or PWM2, the ramp circuitry 352 can control the switch circuitry to allow a current to charge a corresponding capacitor 308 or 316 that provides a corresponding ramp signal RP1 or RP2, and starts to increase the corresponding ramp signal RP1 or RP2. More specifically, referring to FIG. 3, the non-inverting output terminal Q of the SR latch 330, configured to generate the signal PWM1, is coupled to a control terminal such as a gate electrode of the charge switch 306, and the inverting output terminal QB of the SR latch 330, configured to generate a reverse version of the signal PWM1, is coupled to a control terminal such as a gate electrode of the discharge switch 310. If the signal PWM1 is in an on-time state, e.g., logic high, then the charge switch 306 is turned on and the discharge switch 310 is turned off, the capacitor 308 is charged by the current $I_{C308}$, and the ramp signal RP1 increases. Similarly, if the signal PWM2 is in an on-time state, e.g., logic high, then the charge switch 314 is turned on and the discharge switch 318 is turned off, the capacitor 316 is charged by the current $I_{C312}$, and the ramp signal RP2 increases.

Additionally, in one embodiment, the ramp circuitry 352 can control the switch circuitry to discharge the capacitor 308 or 316 in response to a corresponding control signal VC1 or VC2 from the comparing circuit 358. By way of example, upon detection of a control signal VC1, e.g., a signal pulse, the SR latch 330 resets its output terminals Q and QB, and therefore the signal PWM1 turns to logic low, e.g., an off-time state. Thus, the switch charge 306 is off, the discharge switch 310 is on, and the capacitor 308 discharges to ground through the discharge switch 310.

In one embodiment, the ramp circuitry 352 also includes a ramp signal select circuit, e.g., including select switches 320 and 322 (hereinafter, select circuit 320-322). The select circuit 320-322 can be controlled by select signals SR1 and SR2 from the select signal generating circuitry 356, which are generated according to the signals PWM1 and PWM2. Thus, the select circuit 320-322 can select a ramp signal of the ramp signals RP1 and RP2 to be output to the comparing circuit 358 according to the signals PWM1 and PWM2. More specifically, with reference to FIG. 3, the select signal generating circuitry 356 includes SR latches 338 and 340. The SR latch 338 has a set terminal (labeled "S") coupled to the inverting output terminal QB of the SR latch 330 to receive a reverse version of the signal PWM1, has a reset terminal (labeled "R") coupled to the inverting output terminal QB of the SR latch 332 to receive a reverse version of the signal PWM2, and has an inverting output terminal (labeled "QB") to generate the select signal SR1 to control the select switch 320. Similarly, the SR latch 340 has a set terminal S to receive a reverse version of the signal PWM2, a reset terminal R to receive a reverse version of the signal PWM1, and an inverting output terminal QB to generate the select signal SR2 to control the select switch 322. Thus, when the signal PWM1 changes from logic high to logic low, the reverse version of the signal PWM1 changes from logic low to logic high, which sets the select signal SR1 to logic low and the select signal SR2 to logic high. The select switch 320 is off, and the select switch 322 is on. Hence, the ramp signal RP2 is selected and is provided to the comparing circuit 358 through the turned-on switch 322. Similarly, when the signal PWM2 changes from logic high to logic low, the ramp signal RP1 is selected and is provided to the comparing circuit 358 through the turned-on switch 320.

In one embodiment, the comparing circuit 358 generates the control signal VC1 or VC2, e.g., a signal pulse, when a corresponding ramp signal RP1 or RP2 increases to the above mentioned preset reference $V_{PRE}$. More specifically, with reference to FIG. 3, the comparing circuit 358 includes a comparator 324 and a second selector 328. As mentioned above, pulses of the signals PWM1 and PWM2 are generated alternately, therefore the select switches 320 and 322 are turned on alternately, and the ramp signals RP1 and RP2 are provided to the comparator 324 alternately. The comparator 324 alternately compares the ramp signals RP1 and RP2 with the preset reference $V_{PRE}$ to generate a comparison signal VC. The comparison signal VC includes multiple pulses. Similar to the first selector 326, the second selector 328 can receive the pulses of the comparison signal VC, and selectively transfers the pulses to its output terminals OUT1 and OUT2. The pulses generated at the output terminal OUT1 of the second selector 328 can be referred to as control signals VC1, and the pulses generated at the output terminal OUT2 of the second selector 328 can be referred to as control signals VC2. The second selector 328 also receives select signals at its select terminals (labeled "SEL1" and "SEL2") to determine which output terminal OUT1 or OUT2 the pulse of the comparison signal VC is transferred to. In other words, select signals at the select terminals SEL1 and SEL2 can determine which output terminal OUT1 or OUT2 of the second selector 328 to be enabled. In one embodiment, if the delayer 334 detects that the signal PWM1 changes from logic high to logic low, the delayer 334 can generate a select signal DLYB, e.g., at logic high, at its inverting output terminal (labeled "DLYB"). The select signal DLYB is sent to the select terminal SEL1 of the second selector 328 to enable the output terminal OUT2. Additionally, as mentioned above, when the signal PWM1 changes from logic high to logic low, the ramp signal RP2 is selected and is provided to the comparing circuit 358 through the turned-on switch 322. Thus, a result of a comparison between the ramp signal RP2 and the preset reference $V_{PRE}$ is transferred to the output terminal OUT2 of the second selector 328, and the second selector 328 can generate a control signal VC2, e.g., a signal pulse, when the ramp signal RP2 increases to the preset reference $V_{PRE}$. Similarly, if the signal PWM2 changes from logic high to logic low, then a result of a comparison between the ramp signal RP1 and the preset reference $V_{PRE}$ is transferred to the output terminal OUT1, and the second selector 328 can generate a control signal VC1, e.g., a signal pulse, when the ramp signal RP1 increases to the preset reference $V_{PRE}$.

Figure 4:
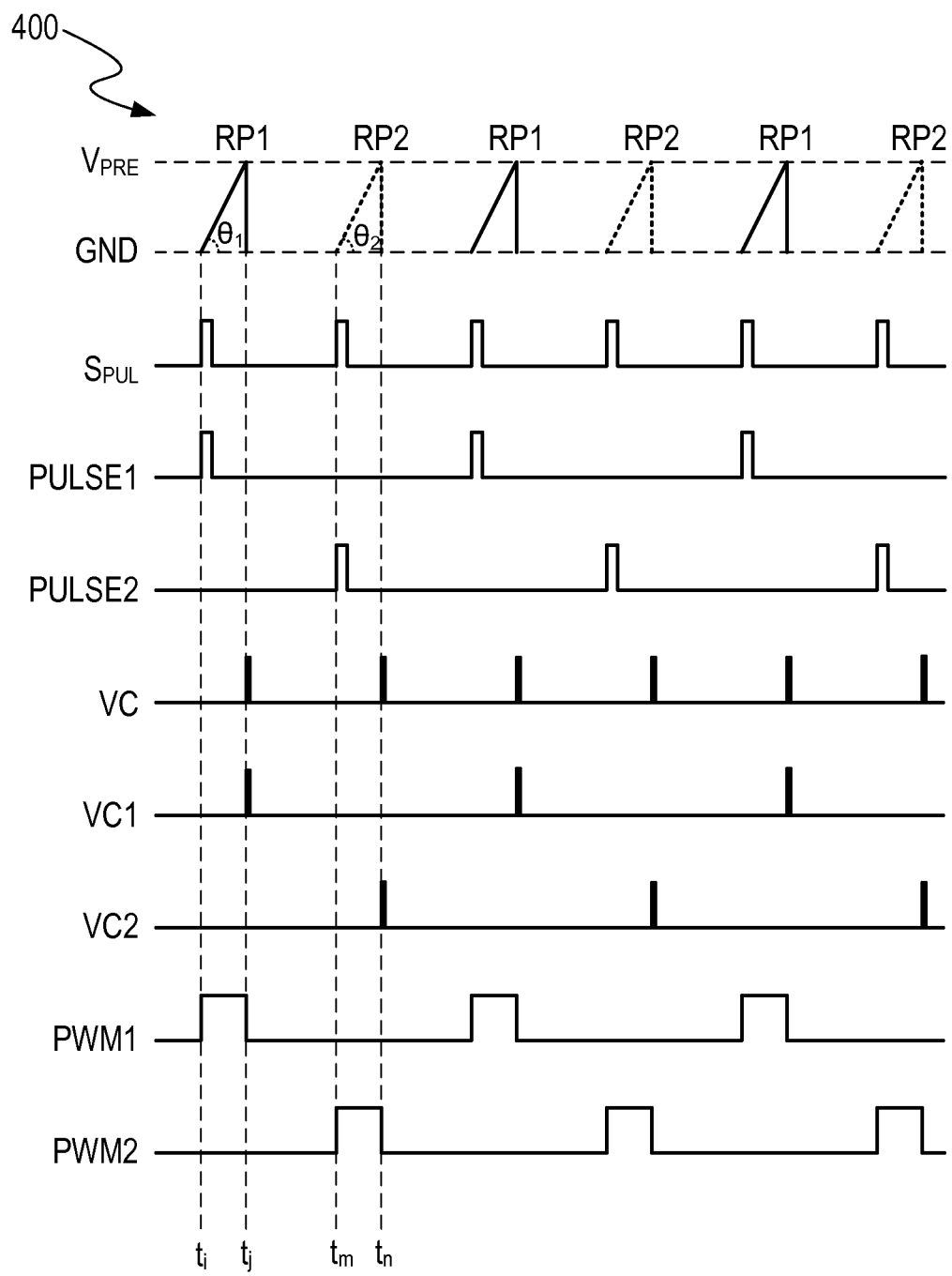
FIG. 4 illustrates a timing diagram of examples of signals associated with a controller, in an embodiment according to the present invention.

Operations performed by the controller 300 are described with reference to FIG. 4. FIG. 4 illustrates a timing diagram of examples of the ramp signals RP1 and RP2, the comparison signal $S_{PUL}$, the trigger signals PULSE1 and PULSE2, the comparison signal VC, the control signals VC1 and VC2, and the signals PWM1 and PWM2, in an embodiment according to the present invention. FIG. 4 is described in combination with FIG. 2 and FIG. 3.

In operation, in one embodiment, when the output voltage $V_{OUT}$ is less than the reference voltage $V_{SET}$, e.g., at time $t_i$, the first selector 326 receives a comparison signal $S_{PUL}$ at logic high, and outputs a trigger signal PULSE1, e.g., a signal pulse. The SR latch 330 receives the trigger signal PULSE1, and sets the signal PWM1 to be logic high. The signal PWM1 at logic high can cause the output voltage $V_{OUT}$ to increase above the reference voltage $V_{SET}$, and therefore the comparison signal $S_{PUL}$ can turn to logic low. The signal PWM1 at logic high can also cause the first selector 326 to enable its output terminal OUT2 such that a trigger signal PULSE2 is generated if a next pulse of the comparison signal $S_{PUL}$ occurs. At time $t_i$, the SR latch 330 also turns on the charge switch 306 and turns off the discharge switch 310, and therefore the ramp signal RP1 increases. When the ramp signal RP1 increases to the preset reference $V_{PRE}$, e.g., at time $t_j$, the comparing circuit 358 generates a control signal VC1, e.g., a signal pulse. The SR latch 330 receives the control signal VC1 and changes the signal PWM1 from logic high to logic low. The SR latch 330 also turns off the charge switch 306 and turns on the discharge switch 310, and therefore the ramp signal RP1 drops to, e.g., zero volts. The signal PWM1 at logic low can cause a comparison result between the ramp signal RP2 and the preset reference $V_{PRE}$ to be transferred to the output terminal OUT2 of the second selector 328. The signal PWM1 at logic low can also cause the output voltage $V_{OUT}$ to decrease. When the output voltage $V_{OUT}$ decreases to be less the reference voltage $V_{SET}$, e.g., at time $t_m$, the comparison signal $S_{PUL}$ turns to logic high, and the first selector 326 generates a trigger signal PULSE2, e.g., a signal pulse. Similar to the SR latch 330, the SR latch 332 receives the trigger signal PULSE2, and sets the signal PWM2 to logic high. The signal PWM2 at logic high can cause the output voltage $V_{OUT}$ to increase above the reference voltage $V_{SET}$, and therefore the comparison signal $S_{PUL}$ can turn to logic low. The signal PWM2 at logic high can also cause the first selector 326 to enable its output terminal OUT1 such that another trigger signal PULSE1 is generated if a next pulse of the comparison signal $S_{PUL}$ occurs. At time $t_m$, the SR latch 332 also turns on the charge switch 314 and turns off the discharge switch 318, and therefore the ramp signal RP2 increases. When the ramp signal RP2 increases to the preset reference $V_{PRE}$, e.g., at time $t_n$, the comparing circuit 358 generates a control signal VC2, e.g., a signal pulse. The SR latch 332 receives the control signal VC2 and changes the signal PWM2 from logic high to logic low. The SR latch 332 also turns off the charge switch 314 and turns on the discharge switch 318, and therefore the ramp signal RP2 drops to, e.g., zero volts. The signal PWM2 at logic low can cause a comparison result between the ramp signal RP1 and the preset reference $V_{PRE}$ to be transferred to the output terminal OUT1 of the second selector 328. The signal PWM2 at logic low can also cause the output voltage $V_{OUT}$ to decrease. When the output voltage $V_{OUT}$ decreases to be less the reference voltage $V_{SET}$, the comparison signal $S_{PUL}$ turns to logic high, and the first selector 326 can generate another trigger signal PULSE1, e.g., a signal pulse, again.

Accordingly, the signals PWM1 and PWM2 can be generated alternately, and on-time intervals, e.g., pulse widths, of the signals PWM1 and PWM2 can be determined by the ramp signals RP1 and RP2 respectively. In one embodiment, a ramp slope of the ramp signal RP1 or RP2 is determined by the capacitance of a capacitive component, e.g., the capacitor 308 or 316, and a current that charges the capacitive component. Taking FIG. 3 for example, a ramp slope $\tan(\theta_1)$ of the ramp signal RP1 can be given by: $\tan(\theta_1) = dV_{RP1}/dt = I_{C308}/C_{308}$, where $V_{RP1}$ represents a voltage level of the ramp signal RP1, $C_{308}$ represents the capacitance of the capacitor 308, and $I_{C308}$ represents a current that charges the capacitor 308; and a ramp slope $\tan(\theta_2)$ of the ramp signal RP2 can be given by: $\tan(\theta_2) = dV_{RP2}/dt = I_{C316}/C_{316}$, where $V_{RP2}$ represents a voltage level of the ramp signal RP2, $C_{316}$ represents the capacitance of the capacitor 316, and $I_{C316}$ represents a current that charges the capacitor 316. In one embodiment, the capacitors 308 and 316 can be chosen and the currents $I_{C308}$ and $I_{C316}$ can be set such that the ramp slopes $\tan(\theta_1)$ and $\tan(\theta_2)$ are controlled to be substantially the same. By way of example, the currents $I_{C308}$ and $I_{C316}$ can be generated, as shown in FIG. 3, using resistors 304 and 312 respectively. Compared with the voltage level of the input voltage $V_{IN}$, voltages across the capacitors 308 and 316, e.g., the voltage levels $V_{RP1}$ and $V_{RP2}$ of the ramp signals RP1 and PR2, are negligible, and voltages across the resistors 304 and 312 can be considered to be the same. The resistors 304 and 312 can be chosen to have the same resistance, and therefore the currents $I_{C308}$ and $I_{C316}$ can be substantially the same, e.g., $I_{C308} = I_{C316}$. Also, the capacitors 308 and 316 can be chosen to have the same capacitance, e.g., $C_{308} = C_{316}$. As a result, the ramp signals RP1 and RP2 can have substantially the same ramp slope. By way of another example, the resistors 304 and 312 can be chosen such that the resistors 304 and 312 have a preset resistance ratio K, e.g., $K = R_{304}/R_{312}$. Hence, the currents $I_{C308}$ and $I_{C316}$ can have a preset current ratio 1/K, e.g., $1/K = I_{C308}/I_{C316}$. The capacitors 308 and 316 can also be chosen such that the capacitors 308 and 316 have a preset capacitance ratio 1/K, e.g., $1/K = C_{308}/C_{316}$. As a result, the ramp signals RP1 and RP2 can have substantially the same ramp slope. As used herein, "substantially the same ramp slope" means the ramp slopes of ramp signals (e.g., including but not limited to the ramp signals RP1 and RP2) may have a relatively small difference caused by voltages across capacitive components (e.g., including but not limited to the capacitors 308 and 316) that provide the ramp signals, and caused by non-ideality of associated components (e.g., including the resistors 304 and 312, the charge switches 306 and 314, the capacitors 308 and 316, etc.), and the difference can be neglected.

In one embodiment, since the ramp signals RP1 and RP2 can have substantially the same ramp slope, a time interval, e.g., $t_j - t_i$, during which the ramp signal RP1 increases from a low voltage level, e.g., zero volts of ground, to a high voltage level, e.g., the preset reference $V_{PRE}$, can be equal to a time interval, e.g., $t_m - t_n$, during which the ramp signal RP2 increases from the low voltage level to the high voltage level. As a result, advantageously, the on-time intervals, e.g., pulse widths, of the signals PWM1 and PWM2 can be substantially the same, and the inductor currents $I_{L212}$ and $I_{L214}$ can have substantially the same ripple magnitude, e.g., be balanced with each other.

Figure 5:
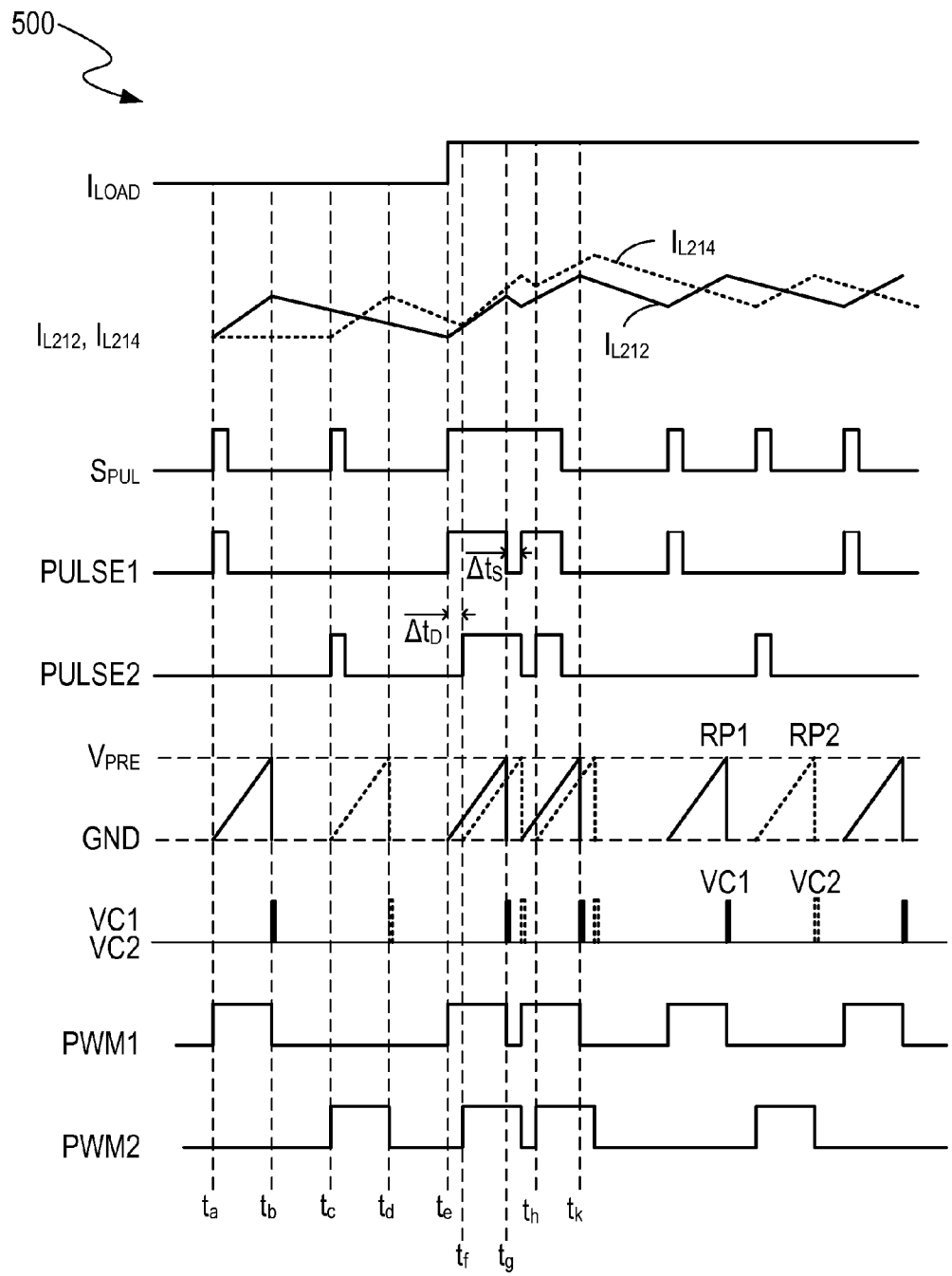
FIG. 5 illustrates a timing diagram of examples of signals associated with a DC to DC converter, in an embodiment according to the present invention.

FIG. 5 illustrates a timing diagram of examples of a load current $I_{load}$ of the DC to DC converter 200, the inductor currents $I_{L212}$ and $I_{L214}$, the comparison signal $S_{PUL}$, the trigger signals PULSE1 and PULSE2, the ramp signals RP1 and RP2, the control signals VC1 and VC2, and the signals PWM1 and PWM2, in an embodiment according to the present invention. FIG. 5 is described in combination with FIG. 2, FIG. 3, and FIG. 4.

FIG. 5 shows an example of a situation when the DC to DC converter 200 powers a heavy load. In the example of FIG. 5, at time $t_e$, the load current $I_{load}$ of the DC to DC converter 200 increases, e.g., power consumed by a load coupled to the DC to DC converter 200 increases, which causes the output voltage $V_{OUT}$ to be less than the reference voltage $V_{SET}$. Thus, as described above, a trigger signal PULSE1 is generated to set the signal PWM1 to be logic high. However, the load may consume a relative large amount of power from the DC to DC converter 200, and the output voltage $V_{OUT}$ may remain less than the reference voltage $V_{SET}$ when the signal PWM1 is set to logic high. Advantageously, by using the first selector 326 and the delayers 334 and 336, the signals PWM1 and PWM2 can be generated to increase an output current, e.g., a combination of the inductor currents $I_{L212}$ and $I_{L214}$, of the DC to DC converter 200 relatively fast, such that the output voltage $V_{OUT}$ can increase to the reference voltage $V_{SET}$.

More specifically, in one embodiment, the first selector 326 can enable its output terminal OUT2 on detection of a rising edge of a signal at its select terminal SEL1, and enable its output terminal OUT1 on detection of a rising edge of a signal at its select terminal SEL2. When the signal at the select terminal SEL2 is logic high, the first selector 326 can also temporarily disable its output terminal OUT1 on detection of a falling edge of a signal at its select terminal SEL1. By way of example, when the select terminal SEL2 is logic high, the output terminal OUT1 of the first selector 326 is enabled. However, during the time the output terminal OUT1 is enabled, if the first selector 326 detects a falling edge at its select terminal SEL1, then the first selector 326 can disable the output terminal OUT1, e.g., at time $t_g$, for a relatively short time interval $\Delta t_S$, and enable the output terminal OUT1 again after the time interval $\Delta t_S$. In one embodiment, during the time interval $\Delta t_S$, the capacitor 308 can discharge to ground and the ramp signal RP1 can decrease to zero volts. Similarly, during the time when the output terminal OUT2 is enabled, if the first selector 326 detects a falling edge at its select terminal SEL2, then the first selector 326 can disable the output terminal OUT2 for a relatively short time interval $\Delta t_{S1}$, e.g., $\Delta t_{S1} = \Delta t_S$, and enable the output terminal OUT2 again after the time interval $\Delta t_{S1}$. In one embodiment, during the time interval $\Delta t_{S1}$, the capacitor 316 can discharge to ground and the ramp signal RP2 can decrease to zero volts. Additionally, in one embodiment, when the delayer 334 detects a rising edge of a signal at its input terminal (labeled "IN"), the delayer 334 can generate a signal at logic high at its non-inverting output terminal (labeled "DLY") with a predetermined delay $\Delta t_D$, and generate a signal at logic low at its inverting output terminal (labeled "DLYB") with the predetermined delay $\Delta t_D$. When the delayer 334 detects a falling edge of a signal at its input terminal IN, the delayer 334 can generate a signal at logic low at its non-inverting output terminal DLY and generate a signal at logic high at its inverting output terminal DLYB, without delay.

As shown in FIG. 5, at time $t_e$, the delayer 334 detects a logic-high level of the signal PWM1. The delayer 334 can generate a logic-high select signal DLY, e.g., at time $t_f$, with a predetermined delay $\Delta t_D$, e.g., $\Delta t_D = t_f - t_e$. Thus, at time $t_f$, the first selector 326 can enable its output terminal OUT2 to generate a trigger signal PULSE2, such that the signal PWM2 is set to logic high. During time $t_f$ to time $t_g$, the signals PWM1 and PWM2 are overlapped, the inductor currents $I_{L212}$ and $I_{L214}$ increase in parallel, and the ramp signals RP1 and RP2 increase in parallel. When the ramp signal RP1 increases to the preset reference $V_{PRE}$, e.g., at time $t_g$, the signal PWM1 is set to be logic low, and therefore the delayer 334 sets the select signal DLY to logic low. Thus, the first selector 326 disables the output terminal OUT1 to set the trigger signal PULSE1 to logic low at time at time $t_g$, and enable output terminal OUT1 to set the trigger signal PULSE1 to logic high after a time interval $\Delta t_S$. In response to a rising edge of the trigger signal PULSE1, the signal PWM1 is set to logic high again. In other words, when the ramp signal RP1 increases to the preset reference $V_{PRE}$, the trigger signal PULSE1 can turn to logic low, and then turn to logic high after a time interval $\Delta t_S$ to cause another pulse of the signal PWM1 to be generated. Similarly, when the ramp signal RP2 increases to the preset reference $V_{PRE}$, the trigger signal PULSE2 can turn to logic low, and then turns to logic high after a time interval $\Delta t_S$ to cause another pulse of the signal PWM2 to be generated. As a result, the signals PWM 1 and PWM2 can be phase-shifted and overlapped with each other, and the inductor currents $I_{L212}$ and $I_{L214}$ can increase in parallel. An output current, e.g., a combination of the inductor currents $I_{L212}$ and $I_{L214}$, of the DC to DC converter 200 can increase relatively fast such that the output voltage $V_{OUT}$ increases to the reference voltage $V_{SET}$.

Figure 6:
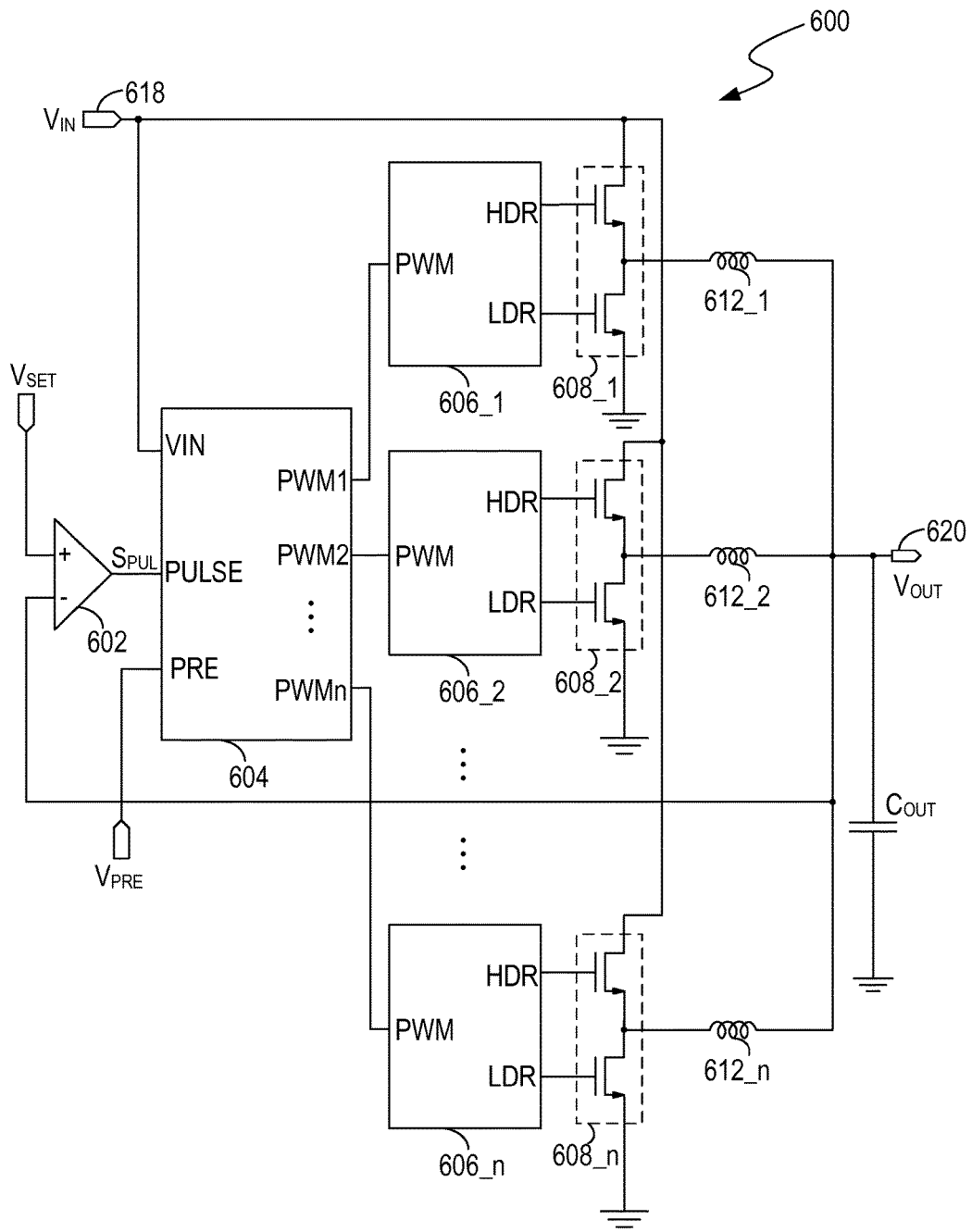
FIG. 6 illustrates a block diagram of an example of a DC to DC converter, in an embodiment according to the present invention.

FIG. 6 illustrates a block diagram of an example of a DC to DC converter 600, in an embodiment according to the present invention. FIG. 6 is described in combination with FIG. 2. As shown in FIG. 6, the DC to DC converter 600 is similar to the DC to DC converter 200 except that the DC to DC converter 600 is an N-phase converter, where n is a natural number greater than two. More specifically, in one embodiment, the DC to DC converter 600 is a buck converter that converts an input voltage $V_{IN}$ at a high-side terminal 618 to an output voltage $V_{OUT}$ at a low-side terminal 620, and the output voltage is less than the input voltage. However, the invention is not so limited. In another embodiment, the DC to DC converter 600 is a boost converter that converts an input voltage at the low-side terminal 620 to an output voltage at the high-side terminal 618, and the output voltage is greater than the input voltage. In yet another embodiment, the DC to DC converter 600 is a buck-boost converter. In the example of FIG. 6, the DC to DC converter 600 includes a comparator 602, a controller 604, driver circuits 606_1-606_n, switching circuits 608_1-608_n, inductors 612_1-612_n, and an output capacitor $C_{OUT}$. The comparator 602, driver circuits 606_1-606_n, switching circuits 608_1-608_n, inductors 612_1-612_n, and output capacitor $C_{OUT}$ are similar to the comparator 202, driver circuits 206 and 226, switching circuits 208 and 210, inductors 212 and 214, and output capacitor $C_{OUT}$ in FIG. 2, respectively.

The controller 604 is also similar to the controller 202 in FIG. 2 except that the controller 604 includes output terminals (labeled "PWM1," "PWM2," ... "PWMn") to output PWM signals PWM1, PWM2, ... PWMn (n=3, 4, 5, ... ). The controller 604 can receive a comparison signal $S_{PUL}$ from the comparator 602, and can alternately and sequentially generate pulses of the signals PWM1-PWMn according to the comparison signal $S_{PUL}$ such that the output voltage $V_{OUT}$ is adjusted to the reference voltage $V_{SET}$. Additionally, the controller 604 can generate ramp signals RP1-RPn (not shown in FIG. 6) having substantially the same ramp slope, and can control on-time intervals, e.g., pulse widths, of the signals PWM1-PWMn by comparing the ramp signals RP1-RPn with a preset reference $V_{PRE}$. Advantageously, in one embodiment, the controller 204 can control the signals PWM1-PWMn to have substantially the same on-time interval according to the comparison of the ramp signals RP1-RPn with the preset reference $V_{PRE}$. Thus, inductor currents flowing through the inductors 612_1-612_n can have substantially the same ripple magnitude, e.g., be balanced with one another.

Figure 7:
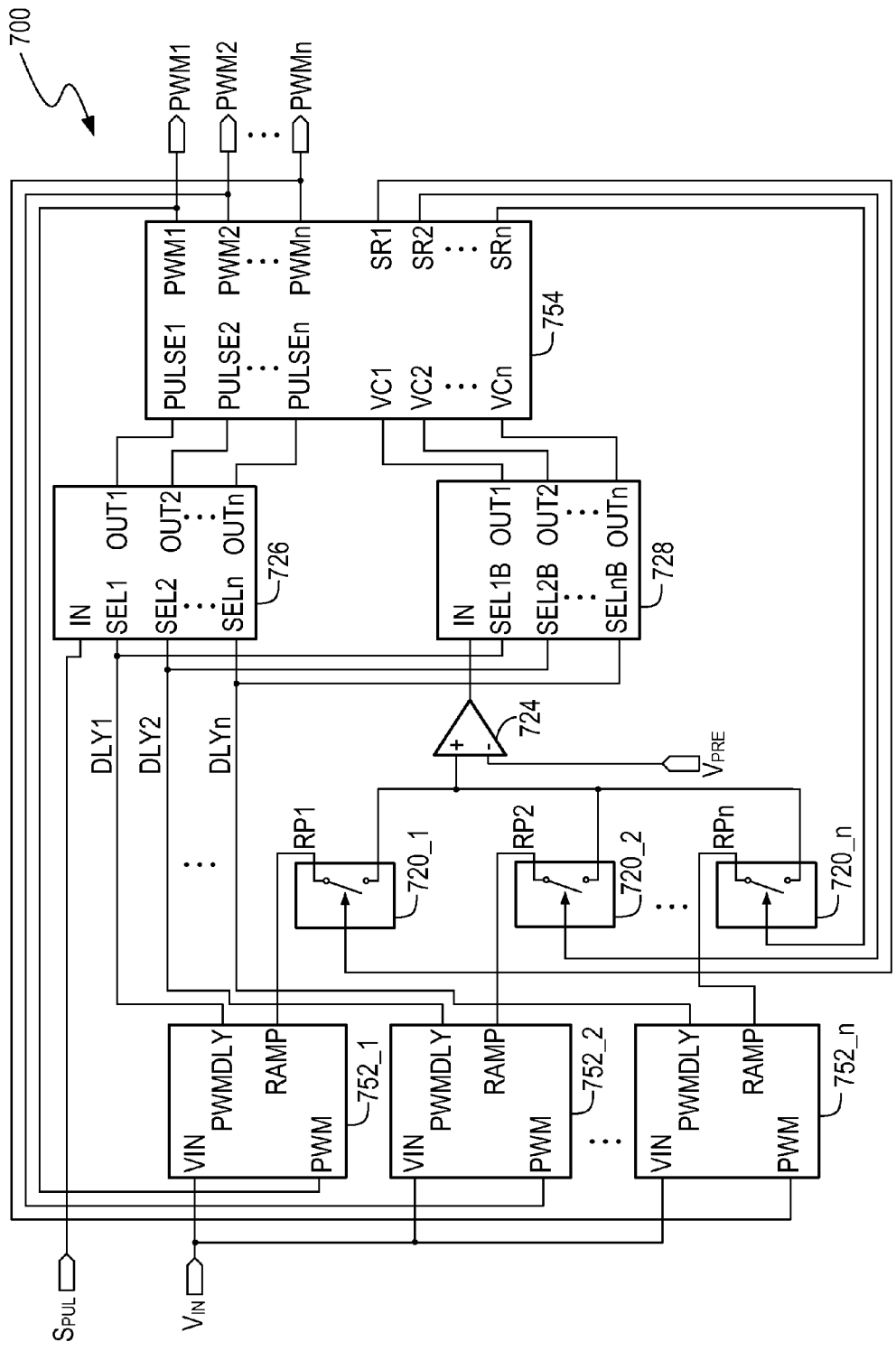
FIG. 7 illustrates a block diagram of an example of a controller for a DC to DC converter, in an embodiment according to the present invention.

FIG. 7 illustrates a block diagram of an example of a controller 700, in an embodiment according to the present invention. The controller 700 can be one embodiment of the controller 604 in FIG. 6. The FIG. 7 is described in combination with FIG. 2, FIG. 3, FIG. 4, FIG. 5, and FIG. 6. As shown in FIG. 7, the controller 700 includes ramp signal generators 752_1-752_n (n=3, 4, 5, ... ), ramp signal select circuits 720_1-720_n, a comparator 724, a first selector 726, a second selector 728, and a PWM signal generator 754.

In one embodiment, each ramp signal generator 752_1-752_n generates a ramp signal RP1, RP2, ... , RPn, respectively, and a select signal DLY1, DLY2, ... , DLYn, respectively, according to a corresponding PWM signal PWM1, PWM2, ... , or PWMn. More specifically, each ramp signal generator 752_1-752_n can include a unit having a structure similar to a ramp signal generate unit in FIG. 3. By way of example, with reference to FIG. 3, the capacitor 308, charge switch 306, discharge switch 310, and resistor 304 constitute a ramp signal generator unit that generates the ramp signal RP1. Each ramp signal generator 752_1-752_n can include a similar ramp signal generator unit to generate a ramp signal RP1, RP2, ... , RPn, respectively. In addition, each ramp signal generator 752_1-752_n can include a delay unit similar to the delayer 334 or 340 in FIG. 3 except that the delay unit includes a non-inverting output terminal and may or may not include an inverting output terminal. When the delayer unit detects a rising edge of a corresponding PWM signal PWM1, PWM2, ... , or PWMn, the delayer unit can generate a signal, e.g., DLY1, DLY2, ... , or DLYn, at a first level such as a logic-high level with a predetermined delay $\Delta t_D$. When the delayer unit detects a falling edge of the PWM signal, the delayer unit can generate a signal, e.g., DLY1, DLY2, ... , or DLYn, at a second level such as a logic-low level without delay.

Each select circuit 720_1-720_n can include a switch, similar to the select switch 320 or 322, that receives a ramp signal RP1, RP2, ... , or RPn, and selectively transfer the ramp signal to the comparator 724 under control of a select signal SR1, SR2, ... , or SRn. By way of example, in response to a logic-high level of a select signal SRx (x=1, 2, ... , or n) from the PWM signal generator 754, a select circuit 720_x turns on a corresponding switch to transfer a ramp signal RPx to the comparator 724. The comparator 724 can be similar to the comparator 324 in FIG. 3.

The first selector 726 can have functions similar to that of the first selector 326 in FIG. 3. By way of example, the first selector 726 can enable its output terminal OUTy (y=2, 3, ... , n) on detection of a rising edge of a signal at its input terminal SEL(y−1), and can enable its output terminal OUT1 on detection of a rising edge of a signal at its input terminal SELn. While an output terminal OUTx (x=1, 2, ... , or n) of the first selector 726 is enabled, if the first select 726 detects a falling edge of a signal at its input terminal SELx, the first selector 726 can temporarily disable the output terminal OUTx and enable the output terminal OUTx again after a preset time interval $\Delta t_S$. The second selector 728 can be similar to the first selector 726 except the second selector 728 includes inverting input terminals SEL1B-SELnB, while the first selector 726 includes non-inverting input terminals SEL1-SELn. The second selector 728 can enable its output terminal OUTy (y=2, 3, . . . , n) on detection of a falling edge of a signal at its input terminal SEL(y−1)B, and can enable its output terminal OUT1 on detection of a falling edge of a signal at its input terminal SELnB.

The PWM signal generator 754 can include a first set of SR latch units similar to the SR latches 330 and 332 in FIG. 3. Each of the first set of SR latch units can set a respective PWM signal PWMx (x=1, 2, . . . , or n) to logic high on detection of a trigger signal PULSEx from a corresponding output terminal OUTx of the first selector 726, and set the signal PWMx to logic low on detection of a control signal VCx from a corresponding output terminal OUTx of the second selector 728. The PWM signal generator 754 can also include a second set of SR latch units similar to the SR latches 338 and 340 in FIG. 3. Each of the second set of SR latch units can generate a respective select signal SR1 or SRy (y=2, 3, . . . , n) to turn on the switch in a corresponding select circuit 72_1 or 720_y when a falling edge of a corresponding PWM signal PWMy or PWM(y−1) occurs.

Accordingly, similar to the controller 300 in FIG. 3, the controller 700 can generate PWM signals PWM1-PWMn phase-shifted related to one another, and can control an on-time interval, e.g., a pulse width, of a signal PWMx (x=1, 2, . . . , or n) by comparing a corresponding ramp signal RPx with a preset reference $V_{PRE}$. Advantageously, the ramp signal generators 752_1-752_n, similar to the ramp signal generating circuitry 352, can control the ramp signals RP1-RPn to have substantially the same ramp slope. As a result, on-time intervals, e.g., pulse widths, of the signals PWM1-PWMn can be substantially the same, and inductor currents flowing through the inductors 612_1-612_n in FIG. 6 can have substantially the same ripple magnitude, e.g., be balanced with one another.

Figure 8:
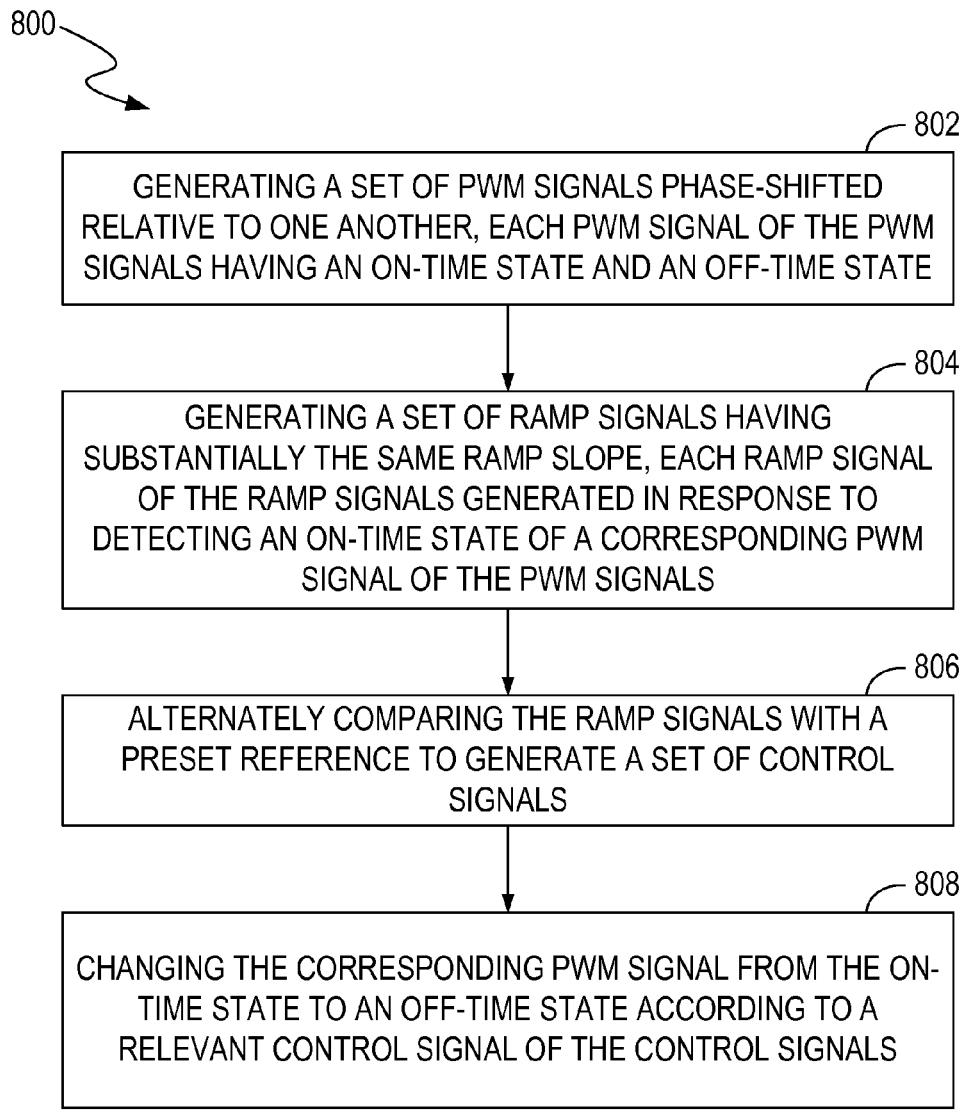
FIG. 8 illustrates a flowchart of examples of operations performed by a controller, in an embodiment according to the present invention.

FIG. 8 illustrates a flowchart 800 of examples of operations performed by a controller, e.g., 204, 300, 604, or 700, in an embodiment according to the present invention. FIG. 8 is described in combination with FIG. 2, FIG. 3, FIG. 4, FIG. 5, FIG. 6, and FIG. 7. Although specific steps are disclosed in FIG. 8, such steps are examples. That is, the present invention is well suited to perform various other steps or variations of the steps recited in FIG. 8.

At step 802, PWM signal generating circuitry, e.g., the circuitry 354 or the signal generator 754, generates a set of PWM signals PWM1-PWMm (m=2, 3, 4, . . . ) that are phase-shifted relative to one another. Each PWM signal of the signals PWM1-PWMm has an on-time state (e.g., a logic-high level) and an off-time state (e.g., a logic-low level).

At step 804, ramp signal generating circuitry, e.g., the circuitry 352 or the signal generators 752_1-752_n, generates a set of ramp signals RP1-RPm having substantially the same ramp slope. Each ramp signal of the ramp signals RP1-RPm is generated in response to detecting an on-time state (e.g., a logic-high level) of a corresponding PWM signal of the signals PWM1-PWMm. For example, a ramp signal RPj (j=1, 2, 3, . . . , m) is generated in response to a pulse of a PWM signal PWMj.

At step 806, a comparing circuit, e.g., the circuit 358 or a combined circuit of the comparator 724 and the second selector 728, alternately compares the ramp signals RP1-RPm with a preset reference $V_{PRE}$ to generate a set of control signals VC1-VCm. Each control signal of the control signals VC1-VCm is generated according to a comparison between a corresponding ramp signal of the ramp signals RP1-RPm and the preset reference $V_{PRE}$. For example, a control signal VCj (j=1, 2, 3, . . . , m) is generated according to a result of a comparison between a ramp signal RPj and the preset reference $V_{PRE}$.

At step 808, a PWM signal PWMj (j=1, 2, 3, . . . , m) of the signals PWM1-PWMm is changed from the on-time state to an off-time state according to a corresponding control signal VCj of the control signals VC1-VCm.

In summary, embodiments according to the present invention provide multi-phase DC to DC converters. The DC to DC converter can control states of PWM signals by comparing ramp signals with a preset reference. The DC to DC converter can generate the ramp signals by charging and discharging capacitive components, and can control the ramp signals to have substantially the same ramp slope. The ramp signals, having substantially the same ramp slope, can ramp up or down between the same low voltage level and the same high voltage level. As a result, the PWM signals can have substantially the same on-time interval to balance inductor currents of the DC to DC converter. The DC to DC converters in embodiments according to the present invention can be used in various applications, e.g., power supply systems for integrated circuits, light emitting diodes, display systems, etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for a DC to DC converter, comprising:
   pulse width modulated (PWM) signal generating circuitry operable for generating a plurality of PWM signals phase-shifted relative to one another, and operable for controlling states of said PWM signals according to a plurality of control signals, each PWM signal of said PWM signals having an on-time state and an off-time state;
   ramp signal generating circuitry, coupled to said PWM signal generating circuitry, operable for generating a plurality of ramp signals having substantially the same ramp slope, each ramp signal of said ramp signals generated in response to detecting an on-time state of a corresponding PWM signal of said PWM signals; and
   a comparing circuit, coupled to said PWM signal generating circuitry and said ramp signal generating circuitry, operable for alternately comparing said ramp signals with a preset reference to generate said control signals, a corresponding control signal of said control signals operable for changing said corresponding PWM signal from said on-time state to an off-time state,
   wherein said PWM signal generating circuitry generates a plurality of trigger signals and controls said corresponding PWM signal to be in said on-time state on detection of a corresponding trigger signal in said trigger signals, and wherein each trigger signal of said trigger signals indicates a situation in which an output voltage of said DC to DC converter is less than a reference voltage.

2. The controller as claimed in claim 1, wherein said ramp signal generating circuitry comprises:
 a plurality of capacitive components; and
 switch circuitry, coupled to said capacitive components, operable for delivering a plurality of currents to charge said capacitive components to generate said ramp signals at said capacitive components,
 wherein said ramp slope is determined by a capacitance of a capacitive component of said capacitive components and a current of said currents that charges said capacitive component.

3. The controller as claimed in claim 2, wherein said ramp signal generating circuitry further comprises:
 a select circuit, coupled to said capacitive components, operable for selecting a ramp signal of said ramp signals to be output to said comparing circuit according to said corresponding PWM signal.

4. The controller as claimed in claim 3, wherein said ramp signal generating circuitry, in response to said on-time state of said corresponding PWM signal, controls said switch circuitry to allow a current to charge a corresponding capacitive component that provides the selected ramp signal, and wherein said ramp signal generating circuitry, in response to said corresponding control signal, controls said switch circuitry to discharge said corresponding capacitive component.

5. The controller as claimed in claim 1, wherein said ramp signal generating circuitry starts to increase a corresponding ramp signal of said ramp signals in response to said on-time state of said corresponding PWM signal, and wherein said comparing circuit generates said corresponding control signal when said corresponding ramp signal increases to said preset reference.

6. The controller as claimed in claim 1, wherein said PWM signal generating circuitry is operable for generating said PWM signals to control a plurality of switching circuits, and each switching circuit of said switching circuits is coupled to an inductive component and operable for allowing a current to flow through said inductive component.

7. The controller as claimed in claim 6, wherein when said corresponding PWM signal is in said on-time state, a corresponding switching circuit of said switching circuits controls a current flowing through a corresponding inductive component to increase, and wherein said PWM signal generating circuitry controls said corresponding PWM signal to be in said on-time state during an on-time interval, and controls said PWM signals to have substantially the same on-time interval by controlling said ramp signals to have said substantially the same ramp slope and by comparing said ramp signals with said preset reference.

8. The controller as claimed in claim 7, wherein said controller is operable for balancing currents flowing through the inductive components coupled to said switching circuits by controlling said PWM signals to have said substantially the same on-time interval.

9. A method for controlling a DC to DC converter, said method comprising:
 generating a plurality of pulse width modulated (PWM) signals phase-shifted relative to one another using PWM signal generating circuitry, each PWM signal of said PWM signals having an on-time state and an off-time state;
 generating a plurality of ramp signals having substantially the same ramp slope, each ramp signal of said ramp signals generated in response to detecting an on-time state of a corresponding PWM signal of said PWM signals;
 alternately comparing said ramp signals with a preset reference to generate a plurality of control signals, using a comparing circuit coupled to said PWM signal generating circuitry;
 changing said corresponding PWM signal from said on-time state to an off-time state according to a corresponding control signal of said control signals;
 generating a plurality of trigger signals, each trigger signal of said trigger signals indicates a situation in which an output voltage of said DC to DC converter is less than a reference voltage; and
 controlling said corresponding PWM signal to be in said on-time state on detection of a corresponding trigger signal in said trigger signals.

10. The method as claimed in claim 9, wherein said generating a plurality of ramp signals comprises:
 delivering, using switch circuitry, a plurality of currents to charge a plurality of capacitive components to generate said ramp signals at said capacitive component, said delivering comprising:
  controlling said switch circuitry to allow a current to charge a corresponding capacitive component of said capacitive components in response to said on-time state of said corresponding PWM signal; and
  controlling said switch circuitry to discharge said corresponding capacitive component in response to said corresponding control signal.

11. The method as claimed in claim 10, wherein said ramp slope is determined by a capacitance of said corresponding capacitive component and said current.

12. The method as claimed in claim 9, further comprising:
 starting to increase a corresponding ramp signal of said ramp signals in response to said on-time state of said corresponding PWM signal; and
 generating said corresponding control signal when said corresponding ramp signal increases to said preset reference.

13. The method as claimed in claim 9, further comprising:
 controlling a plurality of switching circuits using said PWM signals, each switching circuit of said switching circuits coupled to an inductive component and operable for allowing a current to flow through said inductive component; and
 balancing currents flowing through the inductive components coupled to said switching circuits based on said comparing said ramp signals with said preset reference.

14. The method as claimed in claim 9, further comprising:
 controlling a plurality of currents, flowing through a plurality of inductive components respectively, according to said PWM signals;
 increasing a current flowing through a corresponding inductive component of said inductive components when said corresponding PWM signal is in said on-time state;
 controlling said corresponding PWM signal to be in said on-time state during an on-time interval; and
 controlling said PWM signals to have substantially the same on-time interval by controlling said ramp signals to have said substantially the same ramp slope and by comparing said ramp signals with said preset reference.

15. A DC to DC converter comprising:
a plurality of switching circuits, each switching circuit of said switching circuits operable for allowing a current to flow through an inductive component if said inductive component is coupled to said switching circuit; and
a controller coupled to said switching circuits and operable for generating a plurality of PWM signals phase-shifted relative to one another, each PWM signal of said PWM signals having on-time state and an off-time state and operable for controlling a switching circuit of said switching circuits, wherein said controller comprises:
ramp signal generating circuitry operable for generating a plurality of ramp signals having substantially the same ramp slope, each ramp signal of said ramp signals generated in response to detecting an on-time state of a corresponding PWM signal of said PWM signals; and
a comparing circuit, coupled to said ramp signal generating circuitry, operable for alternately comparing said ramp signals with a preset reference to generate a plurality of control signals, a corresponding control signal of said control signals operable for controlling said corresponding PWM signal from said on-time state to an off-time state,
wherein said controller generates a plurality of trigger signals and controls said corresponding PWM signal to be in said on-time state on detection of a corresponding trigger signal in said trigger signals, and wherein each trigger signal of said trigger signals indicates a situation in which an output voltage of said DC to DC converter is less than a reference voltage.

16. The DC to DC converter as claimed in claim 15, wherein said ramp signal generating circuitry comprises:
a plurality of capacitive components; and
switch circuitry, coupled to said capacitive components, operable for delivering a plurality of currents to charge said capacitive components to generate said ramp signals at said capacitive components,
wherein said ramp slope is determined by a capacitance of a capacitive component of said capacitive components and a current of said currents that charges said capacitive component.

17. The DC to DC converter as claimed in claim 16, wherein said ramp signal generating circuitry further comprises:
a select circuit, coupled to said capacitive components, operable for selecting a ramp signal of said ramp signals to be output to said comparing circuit according to said corresponding PWM signal.

18. The DC to DC converter as claimed in claim 17, wherein said ramp signal generating circuitry, in response to said on-time state of said corresponding PWM signal, controls said switch circuitry to allow a current to charge a corresponding capacitive component that provides the selected ramp signal,
and wherein said ramp signal generating circuitry, in response to said corresponding control signal, controls said switch circuitry to discharge said corresponding capacitive component.

19. The DC to DC converter as claimed in claim 15, wherein said ramp signal generating circuitry starts to increase a corresponding ramp signal of said ramp signals in response to said on-time state of said corresponding PWM signal, and wherein said comparing circuit generates said corresponding control signal when said corresponding ramp signal increases to said preset reference.

20. The DC to DC converter as claimed in claim 15, wherein when said corresponding PWM signal is in said on-time state, a corresponding switching circuit of said switching circuits controls a current flowing through a corresponding inductive component to increase, and wherein said controller controls said corresponding PWM signal to be in said on-time state during an on-time interval, and controls said PWM signals to have substantially the same on-time interval by controlling said ramp signals to have said substantially the same ramp slope and by comparing said ramp signals with said preset reference.

21. The DC to DC converter as claimed in claim 20, wherein said controller is operable for balancing currents flowing through the inductive components coupled to said switching circuits by controlling said PWM signals to have said substantially the same on-time interval.

* * * * *